United States Patent [19]
Moore

[11] 3,932,095
[45] Jan. 13, 1976

[54] BLOW MOLDING APPARATUS
[75] Inventor: Lawrence A. Moore, Rockford, Ill.
[73] Assignee: Beloit Corporation, Beloit, Wis.
[22] Filed: Oct. 26, 1973
[21] Appl. No.: 409,969

[52] U.S. Cl............................ 425/397; 425/DIG. 208; 425/DIG. 211; 425/DIG. 213
[51] Int. Cl.² .......................................... B29D 23/03
[58] Field of Search......... 425/242 B, 387 B, 326 B, 425/246, 451, 121, 126, 242, DIG. 203, DIG. 213, DIG. 211

[56] References Cited
UNITED STATES PATENTS

| | | | |
|---|---|---|---|
| 2,899,696 | 3/1959 | Cox | 198/25 |
| 2,994,107 | 8/1961 | Quinche | 425/126 |
| 3,079,637 | 3/1963 | Marzillier | 425/387 B |
| 3,599,280 | 8/1971 | Rosenkranz et al. | 425/326 B |
| 3,790,319 | 2/1974 | Hudson et al. | 425/DIG. 213 |

Primary Examiner—Francis S. Husar
Assistant Examiner—Gus T. Hampilos
Attorney, Agent, or Firm—Larson, Taylor and Hinds

[57] ABSTRACT

A blow molding apparatus including a rotary frame located adjacent a parison heating oven and having a plurality of blow molds mounted thereon for rotation therewith about the frame axis. A separate transfer arm is provided for each blow mold, the transfer arms also being located on the rotating frame for rotation therewith, each transfer arm being operable to transfer heated parisons from the oven to its respective blow mold.

11 Claims, 4 Drawing Figures

BLOW MOLDING APPARATUS

BACKGROUND OF THE INVENTION

This invention relates to blow molding, and in particular it relates to increasing the production rate of a cold parison blow molding apparatus.

Numerous products such as foods, liquid soaps, etc. are now packaged and sold in non-breakable containers, generally referred to as "plastic bottles". These containers, which are commonly made from a polyolefin such as polyproplylene are normally manufactured, inter alia, by extruding the material into an elongated endless hollow tube and then cutting this tube into sections, referred to as parisons, and blow molding these parisons into finished articles. While numerous different materials may be used, for convenience this application will refer specifically to polypropylene.

The two basic procedures for forming parisons into finished articles are known as the hot parison technique wherein the extruded parisons, while still hot from the extrusion process, are cut into sections and immediately blow molded, and the cold parison technique wherein the extruded tube is cut into parisons which are then stored and then at a subsequent point in time reheated and blow molded into finished articles. A feature of this cold parison technique includes stretching of the heated parisons just prior to blow molding thereof.

In my copending application Ser. No. 276,071, filed July 28, 1972, now U.S. Pat. No. 3,765,813, issued on Oct. 16, 1973, which is a continuation of my earlier application Ser. No. 3003, filed Jan. 15, 1970, now abandoned, there is described a new and improved cold parison blow molding method and apparatus. In that basic arrangement, the parisons are placed on a conveyor and moved through an oven for a period of time sufficient to heat the parisons to the proper forming temperature, whereupon a transfer arm removes the heated parisons and transfers the same to a blow mold.

While the arrangement of my said previous application represents a major step forward in the art of cold parison blow molding, there exists a continuing need for new and improved arrangements, especially for increasing the output rate per unit of machine cost.

The present invention is an improvement of my said earlier patent and consequently my said earlier U.S. Pat. No. 3,765,813 is incorporated herein for all of the details described therein, the present specification being directed essentially to the improvements thereof.

One possible arrangement for increasing the production rate of any blow molding apparatus is to provide a plurality of blow molds on a rotating frame. Such an arrangement is shown for example as applied to the formation of disc shaped preforms into wide mouth containers in my earlier U.S. Pat. No. 3,661,489, issued May 9, 1972. For details of such a rotary multiple blow molding arrangement, per se, my said earlier U.S. Pat. No. 3,661,489 is incorporated herein by reference.

SUMMARY OF THE INVENTION

Thus, it is a purpose of the present invention to provide a new and improved cold parison blow molding apparatus having an increased production output rate relative to presently known apparatus.

This purpose of the present invention is accomplished by providing, in combination, a parison heating oven of the type wherein a large number of parison are mounted on support means within an oven and moved therethrough, a rotary frame having a plurality of blow molds mounted thereon for rotation therewith about the frame axis, together with transfer means including a separate transfer arm for each of the blow molds, the transfer arms being mounted on the rotary frame for rotational movement therewith about the frame axis and also for additional movement for bringing the heated parison from the oven to their respective blow molds.

In accordance with a preferred embodiment, both the oven conveyor supporting the parisons and the rotary frame are movable continuously, as opposed to intermittently, and the transfer arms are adapted to move, relative to the oven conveyor chain, such that zero relative movement is effected between the transfer arms and the oven conveyor chain at the moment when the transfer arm grasps and removes a parison from the oven conveyor chain so that the said continuous movement of the various parts need not be interrupted.

In accordance with a preferred arrangement of the present invention, the rotating frame includes a plurality of blow molds of the type illustrated in my said U.S. Pat. No. 3,661,489, wherein the mold halves are mounted on clamp arms which are pivotable about a pivot axis and which extend outwardly from this pivot axis. The transfer arm for each blow mold preferably comprises a vertical post rotatable about a vertical axis spaced angularly about the rotary frame from its respective blow mold and including a horizontally extending arm having a gripper means at the end thereof remote from the vertical post, the horizontal transfer arm being turnable about said vertical axis so as to move its gripper means between the oven and its respective blow mold. In operation, the transfer arm preferably moves in the same angular sense as the rotary frame as its respective blow mold approaches the oven. As the transfer arm enters the oven and is about to grasp a parison, it reverses its direction of rotation, thereby momentarily moving with the conveyor chain so as to effect said zero relative movement as it grasps and removes a parison, after which the transfer arm continues in said reverse direction to carry the parison back to its respective blow mold.

In accordance with a preferred operation of the present invention, and in accordance with the blow molding techniques as set forth in my said earlier U.S. Pat. No. 3,765,813, as the parison is lowered to its respective blow mold, the bottom of the parison is grasped beneath the mold halves whereupon the transfer arm, while still gripping the top of the parison, moves upwardly as as to stretch the same, after which the mold halves close onto the parison. Air is then introduced under pressure into the parison through the bottom thereof for forming the parison into a finished article. Subsequently the mold halves are opened for ejection of the finished article, after which the transfer arm returns to the oven to grasp another parison.

Thus, it is an object of the invention to increase the production rate for a cold parison blow molding operation.

It is another object of this invention to provide a new and improved blow molding arrangement of the type wherein parisons are heated within an oven, including, in combination with this oven, a plurality of blow molds and improved transfer means for transferring the parisons to these blow molds.

It is another object of this invention to provide a cold parison blow molding apparatus combining an oven of the type wherein a plurality of parisons are heated by moving through the oven with a plurality of blow molds mounted on a rotatable frame, including individual transfer means associated with each of the blow molds.

Other objects and advantages of the present invention will become apparent from the detailed description to follow, together with the accompanying drawings.

BRIEF DESCRIPTION OF THE DRAWINGS

There follows a detailed description of a preferred embodiment of the invention to be read together with the accompanying drawings wherein.

DETAILED DESCRIPTION OF THE PREFERRED EMBODIMENTS

Figure 1:
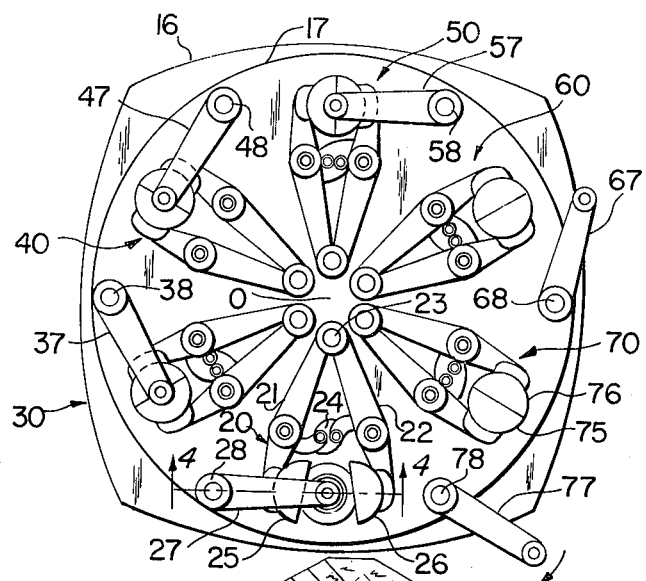
FIGS. 1, 2 and 3 are schematic plan views of a blow molding apparatus incorporating the features of the present invention, the three views illustrating the arrangement in three successive positions.

Referring now to the drawings, like elements are represented by like numerals through out the several views.

Figure 4:
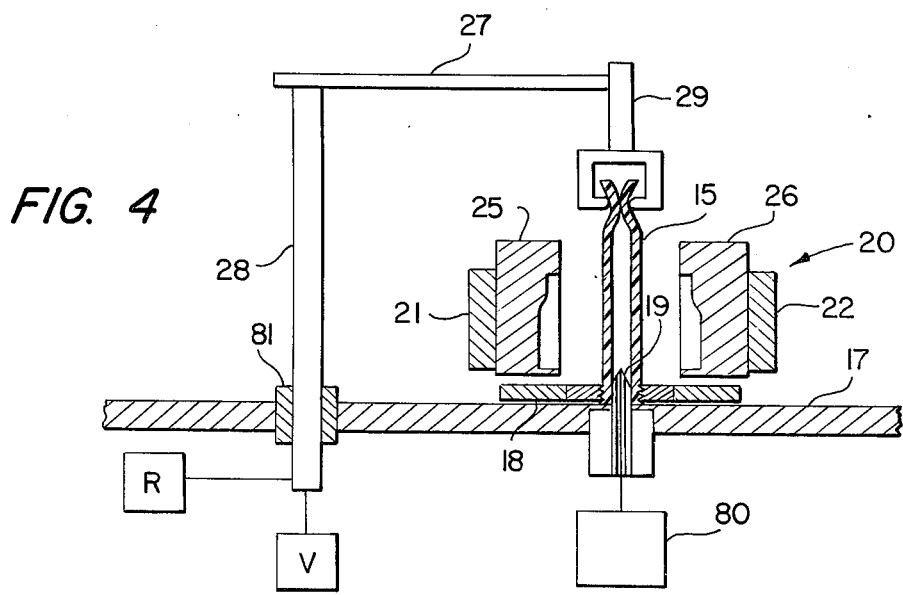
FIG. 4 is an enlarged partial sectional view taken along line 4—4 of FIG. 1.

Referring to FIGS. 1 and 4, there is shown a blow molding apparatus including an oven 10 having therein a plurality of sprocket wheels 12 supporting a chain conveyor 11 having a number of upwardly extending support means for supporting parisons No. Some of these sprocket wheels 12 will be idler wheels while one or more would be drive wheels for driving the chain 11. Details of the oven including details of the conveyor chain 11 and the means for supporting the individual parisons 15 are clearly shown in my said U.S. Pat. No. 3,765,813. It will be understood, however, that the oven can take many different forms, so long as it is capable of moving the parisons therethrough and heating the parisons to a forming temperature. An example of another type of oven is shown in my copending application Ser. No. 271,714 now U.S. Pat. No. 3,801,263. In that case the various elements are arranged somewhat differently and the air flow is horizontally across the oven rather than vertically through the oven.

The apparatus includes a stationary frame 16 having mounted thereon a rotating frame 17 in the form of a rotating table having mounted thereon for rotation about the axis 0 a plurality of blow molds 20, 30, 40, 50, 60 and 70. All of the blow molds and their respective transfer arms are identical, and therefore only the blow mold 20 will be described in detail. Elements of the other blow molds corresponding to the detailed 21–29 of the blow mold 20 and its respective transfer arm carry the first digit of the numeral referring generally to the blow mold and a last digit corresponding to the last digit of the elements 21–29.

Referring now to FIGS. 1 and 4, the blow mold 20 includes a pair of clamp arms 21 and 22 pivotally connected together at a pivot axis 23, which axis is fixed to the frame 17 for rotation therewith about the frame axis 0. At their outer ends, the clamp arms 21 and 22 carry mating mold halves 25 and 26 which are movable towards and away from each other under the action of a clamping unit 24. This curved toggle type of clamping unit is further described in both my said U.S. Pat. No. 3,765,813 and also in my said U.S. Pat. No. 3,611,489. It is sufficient to note that as the circular element 24 rotates about its axis under the action of a rotary motor, the clamp arms 21 and 22 are urged together when the element 24 turns counterclockwise and are separated from each other when the element 24 turns clockwise.

Referring to FIG. 4, each blow molding station includes a thread clamp unit 18, details of which are clearly described in my said U.S. Pat. No. 3,765,813, which includes a threaded circular opening for grasping the exterior of the bottom of the parison and a plug 19 movable up into the interior of the bottom of the parison. The clamp 18 performs the dual function of holding the bottom of the parison during blow molding and also forming a threaded exterior on the bottom of the parison which will become the threaded opening of the finished bottle. The nozzle 19 also preforms a dual function. Firstly, it supports the interior bottom of the parison during blow molding. Secondly, air is introduced through this nozzle for the blowing operation after the mold halves have closed onto the parison. Means for raising and lowering the nozzle 19 and for introducing air thereinto are clearly shown in my said earlier U.S. Pat. No. 3,765,813, and hence details thereof are not included, these elements being represented schematically by the box 80 in FIG. 4.

Unlike the arrangement in my said earlier application, in the present case the fluid lines to the plurality of blow molds is further complicated by the fact that the molds are rotating whereas the fluid source is generally stationary. Valve means for delivering fluids under pressure between a stationary source and a plurality of rotating elements are well known per se and need not be described in detail herein. Merely as one example, reference may be made to the Cote U.S. Pat. No. 3,365,748, issued Jan. 30, 1968.

Associated with the mold 20 is a transfer member comprising a vertical post 28 rotatable about its axis and movable vertically along its axis. Connected thereto is a horizontal transfer arm 27, to the outer end of which is attached a gripper 29 having gripper fingers at the lower end thereof which are movable towards and away from each other for grasping and releasing a parison. In accordance with the present invention, the fingers of gripper 29 must be movable towards and away from each other and the post 28 must be movable about its axis and vertically. The details for accomplishing these movements are known and hence, such details need not be included herein. Means for rotating the arm 28 are represented schematically by the box labeled R while means for moving the post 28 vertically are represented by the box V. As an example of one arrangement for so moving the various portions of the transfer member, reference may be had to my said copending application Ser. No. 276,071. It will be understood, however, that other means may be used for carrying out these functions.

Figure 2:
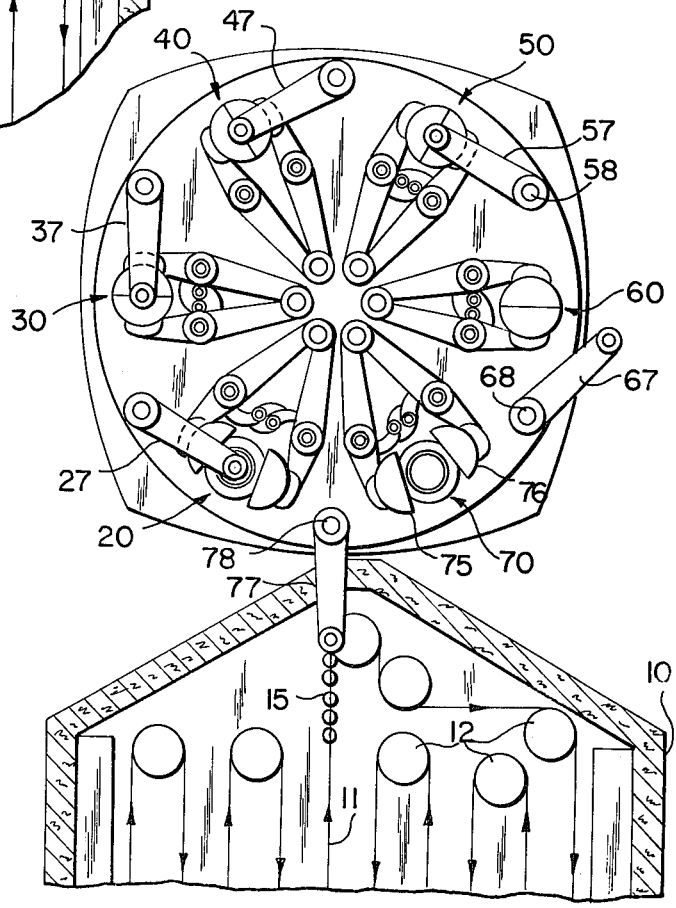
Figure 3:
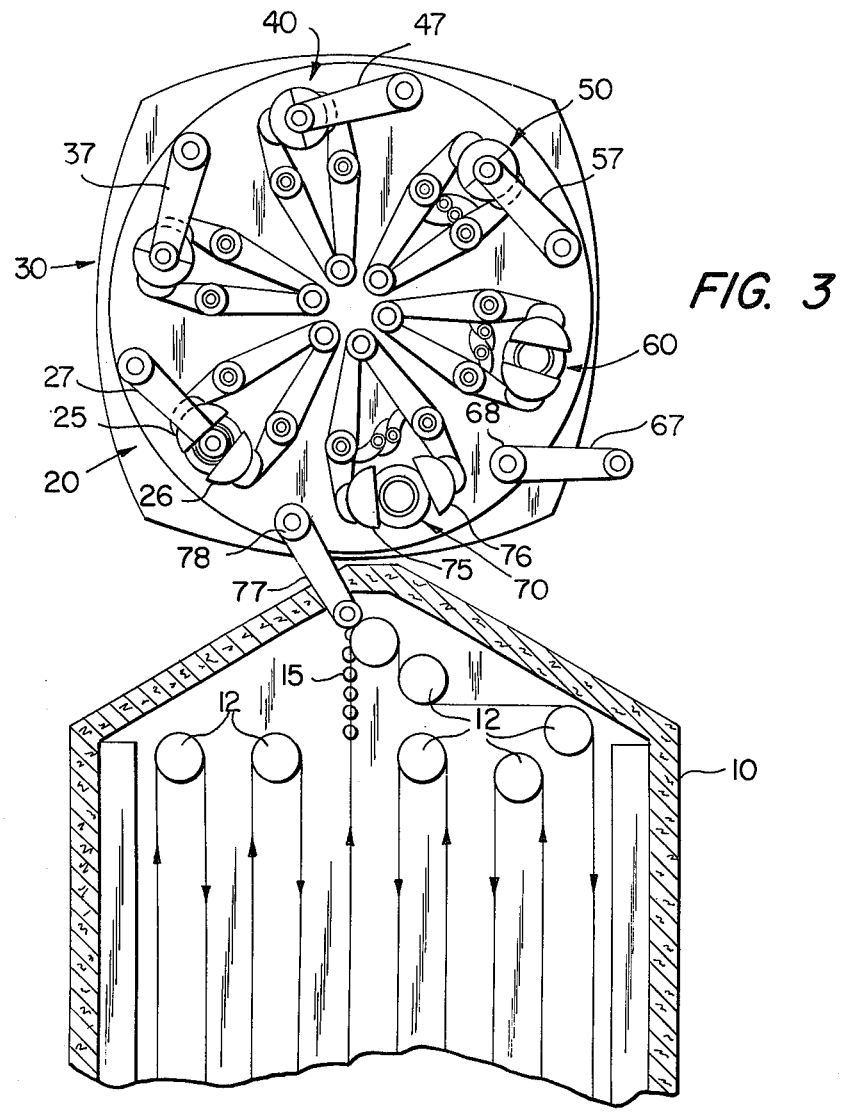

Referring now to the figures, the operation of the invention will now be described. Referring first to FIG. 1, note the position of the transfer arms 57, 67 and 77 and note also the position of these transfer arms in FIG. 2. As the mold halves are closed during blow molding (positions of molds 30, 40, 50 and 60 in FIG. 1) the transfer arm conveniently remains in position over its respective mold. As each mold then moves around to approximately the position of mold 60 in FIG. 1, its respective transfer arm starts moving about its vertical axis clockwise, i.e. in the same angular direction as that of the rotating frame 17 about axis 0. At first, the transfer arm swings around such that it gripper is beyond the periphery of stationary frame 16 as shown at 67 in FIG. 2. At this point the transfer arm grippers may be released to release the upper scrap piece of the parison into a suitable receptacle. Also, in this general area, the mold halves can separate from each other to eject the finished article. This clockwise movement of the transfer arm about its vertical axis continues until it extends radially relative to the axis 0 as shown at 77 in FIG. 2. At this point the arm 77 is moved downwardly to grasp a parison 15 on the conveyor chain 11 and concurrently the arm 77 starts turning counterclockwise about the axis of its posts 78. As a result of this counterclockwise movement, coupled with the clockwise movement of the rotatable frame 17, the grippers move with the conveyor chain 11 at zero speed relative thereto as the transfer arm 77 moves from its FIG. 2 position to its FIG. 3 position. During this time, the grippers have gripped a parison and moved it upwardly off of its support means. After this, the transfer arm 77 continues moving counterclockwise as the rotating frame 17 moves clockwise until the parison is directly over the central point between its corresponding mold halves, whereupon the transfer arm moves downwardly, lowering the parison, whereupon the bottom of the parison is gripped by the clamp 18. This position is shown at the mold 20 in FIG. 1 and in FIG. 4. After this the transfer arm 27 will rise upwardly stretching the parison, after which the mold halves will close for the molding process as mentioned earlier, and as illustrated at the position of molds 30, 40 and 50 in FIGS. 1, 2 and 3.

Although the invention has been described in considerable detail with respect to a preferred embodiment thereof, it will be apparent that the invention is capable of numerous modifications and variations apparent to those skilled in the art without departing from the spirit and scope of the invention.

I claim:
1. A blow molding apparatus comprising:
  an oven, an oven support means within the oven for supporting a plurality of parisons in the oven and moving them through the oven,
  a rotating frame positioned adjacent the oven, a plurality of blow molds mounted on said frame to rotate therewith, and
  a separate transfer member associated with each of said plurality of blow molds and distinct from its respective blow mold, each transfer member being mounted on the rotating frame to rotate therewith and hence with its respective blow mold, and each transfer member being movable between at least a first position and a second position, the transfer member including means for engaging a parison at said first position while the parison is on said oven support means and removing the parison therefrom and carrying the parison to said second position at which it loads that removed parison into its respective blow mold.

2. An apparatus according to claim 1, said support means being operable to move the parison through the oven continuously, and said transfer members being mounted to move concurrently with the support means as it removes a parison from the oven, thereby effecting essentially zero relative movement between the transfer member and the support means as the transfer member removes a parison from the continuously moving support means.

3. An apparatus according to claim 1, each transfer member including a horizontal transfer arm having a gripper extending downwardly therefrom, said transfer arm being movable to move said gripper horizontally between its respective blow mold and the oven and also vertically at the oven to grasp and remove a parison and vertically at the blow mold to lower the parison into place at the blow mold.

4. An apparatus according to claim 1, each transfer member including a vertical post turnable about a vertical axis and spaced angularly about the frame axis from the center of its respective blow mold, and a transfer arm extending horizontally from said post and turnable about said post axis for movement between said first and second positions.

5. An apparatus according to claim 4, each transfer member post being located angularly ahead of its respective blow mold, taken in the direction of rotation of the frame, and movable in the same angular sense as the frame when the transfer arm moves into the oven to grasp a parison and in the reverse angular sense as it grasps the parison and carries it back to the mold.

6. An apparatus according to claim 5, wherein the transfer arm is mounted to change its rotational direction just prior to its engaging a parison and moving with said support means at essentially zero relative movement with respect to said support means as it grasps and removes a parison.

7. An apparatus according to claim 6, each blow mold including a pair of mold halves closable onto each other on a central plane passing through the said frame axis, and a pair of clamping arms extending outwardly from a pivot connection located on said central plane and spaced radially outwardly from the frame axis, said mold halves connected onto each of said clamp arms, and means for moving the clamp arms towards and away from each other for closing and opening the blow mold, respectively.

8. An apparatus according to claim 7, each blow mold including a means on its central plane for engaging the bottom of a parison and for blowing air into the parison upon closing of the blow mold, and said transfer arm being movable, after the blow mold has been closed, to carry the upper scrap piece of the parison horizontally away from the blow mold to deposit the same off to the side of the rotating frame.

9. An apparatus according to claim 8, including six said blow molds spaced equiangularly about said frame axis.

10. An apparatus according to claim 1, each blow mold including a pair of mold halves closable onto each other on a central plane passing through the said frame axis, and a pair of clamp arms extending outwardly from a pivot connection located on said central plane and spaced radially outwardly from the frame axis, said mold halves connected one to each of said clamp arms, and means for moving the clamp arms towards and away from each other to close and open the mold, respectively, each blow mold further including a means on its central plane for engaging the bottom of a parison and for blowing air thereinto upon closing of the mold halves.

11. An apparatus according to claim 1, including lower clamp means at each blow mold for grasping the bottom of a parison and blowing air thereinto, said transfer member including a transfer arm movable horizontally between the blow mold and the oven, movable vertically at the oven to grasp and remove a parison, and movable vertically at the blow mold to lower the bottom of the parison to the lower clamp means, and to stretch the parison by moving the top thereof upwardly while the bottom is held by said lower clamp means.

* * * * *